UNITED STATES PATENT OFFICE.

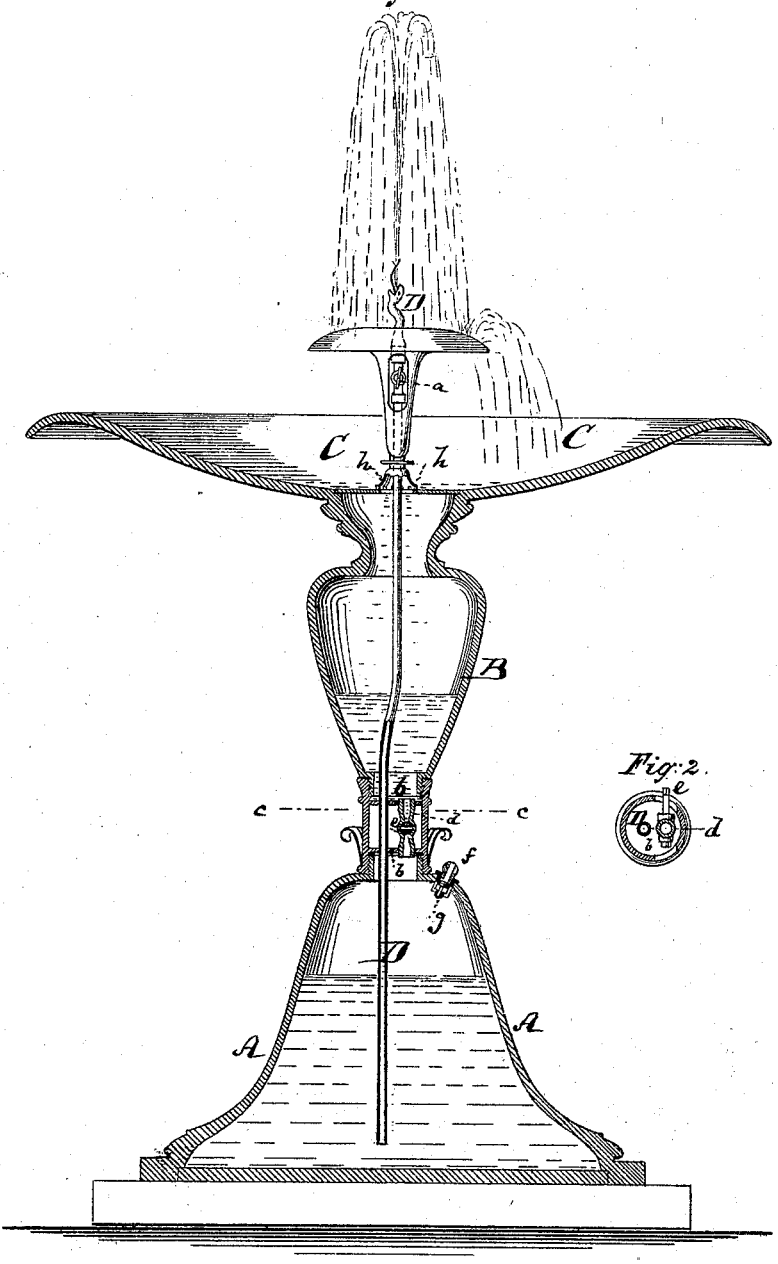

RICHARD V. BRIESEN, OF WEEHAWKEN, NEW JERSEY, ASSIGNOR OF ONE-HALF HIS RIGHT TO GEORGE J. WENCK, OF NEW YORK, N. Y.

IMPROVEMENT IN PARLOR-FOUNTAINS.

Specification forming part of Letters Patent No. 151,003, dated May 19, 1874; application filed April 27, 1874.

*To all whom it may concern:*

Be it known that I, RICHARD V. BRIESEN, of Weehawken, in the county of Hudson and State of New Jersey, have invented a new and Improved Self-Acting Parlor-Fountain, of which the following is a specification:

Figure 1 is a vertical central section of my improved parlor-fountain; Fig. 2, a detail horizontal section on the line $c$ $c$, Fig. 1.

Similar letters of reference indicate corresponding parts in both figures.

This invention relates to a new self-acting parlor-fountain; and consists of the novel arrangement of parts, hereinafter more fully described.

In the drawing, the letter A represents the base or lower part of the fountain; B, the neck or middle part, and C the bowl or top part, of the same. D is the pipe, through which the liquid is to be ejected in a spray or column, said pipe extending from the lower part of the vessel A clear through the whole length of the apparatus, and is open at both ends. Its lower end is a short distance above the bottom of A. A cock, $a$, is arranged in the pipe D, preferably above the bowl, to open or shut the said pipe, and regulate the flow of liquid through it. The vessel A is separated from the vessel B by one or two partitions or diaphragms, $b$ $b$, through which a vertical connecting-pipe, $d$, having a cock, $e$, is placed, as shown. When the cock $e$ is closed, all communication between the vessels A and B is shut off. The pipe D also passes through the plates $b$. $f$ is a nozzle applied to the vessel A, and provided with an outwardly-closing valve, $g$.

The operation is as follows: When liquid of suitable kind has been poured into the bowl C, it flows through apertures $h$ $h$ of the bowl into the vessel B. The cock $e$ is then opened, so that the liquid will enter the vessel A. When the last-named vessel is about half or two-thirds full of water or other liquid, the cock $e$ is closed, an air-pump connected to the nozzle $f$, and air forced into the vessel A, and compressed therein, the cock $a$ being meanwhile shut. The valve $g$ in the nozzle $f$ prevents all escape of the compressed air from A during the operation of the pump and afterward. When the air in A has been compressed to the requisite degree, the pump is detached, and the apparatus charged for operation. The cock $a$ can now be opened more or less, whereupon the air in A, with its tendency to expand, will force the liquid from A in a fine column up through the pipe D. The fountain is thus in operation. The liquid discharged by the pipe D will fall back into the bowl, and find its way into the vessel B through the apertures $h$. If scented liquids are used, they are thus, in the vessel B, protected from evaporation. When the power of the compressed air has been spent, the cock $e$ is reopened, and the liquid thus conveyed back to A. The apparatus can then be recharged with compressed air, and the operation resumed.

I claim as my invention—

In a parlor-fountain, the combination of the lower vessel A, having the nozzle $f$ and valve $g$, with the intermediate vessel B, upper bowl C, connecting-pipe $d$, cock $e$, and discharge-pipe D, all arranged for operation substantially as described.

The foregoing specification of my invention signed by me this 24th day of April, 1874.

RICHARD V. BRIESEN.

Witnesses:
A. V. BRIESEN,
F. V. BRIESEN.